United States Patent [19]

Kondo et al.

[11] 4,344,395

[45] Aug. 17, 1982

[54] IGNITION SYSTEM WITH IGNITION TIMING RETARDING CIRCUIT FOR INTERNAL COMBUSTION ENGINE

[75] Inventors: Tadashige Kondo; Susumu Ohno, both of Tokyo; Kenichi Takata, Mitaka; Hisashi Inaga, Tokyo, all of Japan

[73] Assignee: Kioritz Corporation, Japan

[21] Appl. No.: 149,884

[22] Filed: May 14, 1980

[51] Int. Cl.³ .......................... F02D 5/04; F02P 1/00; F02D 11/10

[52] U.S. Cl. .................................. 123/335; 123/602

[58] Field of Search ............... 123/335, 596, 597, 599, 123/600, 602, 630, 650; 315/209 R; 310/70 A, 70 R

[56] References Cited

U.S. PATENT DOCUMENTS

| | | | |
|---|---|---|---|
| 4,074,665 | 2/1978 | Patis | 123/335 |
| 4,132,208 | 6/1979 | Yukawa | 123/602 |
| 4,144,859 | 3/1979 | Ohki et al. | 123/335 |
| 4,150,652 | 4/1979 | Nagasawa | 123/602 |
| 4,204,490 | 5/1980 | Ohki et al. | 123/335 |

*Primary Examiner*—Raymond A. Nelli

*Attorney, Agent, or Firm*—Karl W. Flocks

[57] ABSTRACT

An ignition system for an internal combustion engine is provided with an ignition timing retarding circuit to prevent overrunning of the engine. The ignition timing retarding circuit includes a switching circuit connected to the gate of an ignition control thyristor and a predetermined duration signal generator for generating a signal having a predetermined duration from a predetermined reference time. During the time period in which the predetermined duration signal is applied to the switching circuit, the switching circuit is maintained conductive to thereby bypass an ignition signal generated in synchronism with the crankshaft rotation and applied to the gate of the ignition control thyristor. As the engine speed increases, since the period of generation of the ignition signal is shortened, by selecting the duration of the predetermined duration signal with respect to the period of the ignition signal corresponding to a high engine speed to be prevented so that the leading end portion of the ignition signal overlaps the terminating end of the predetermined duration signal by a desired period of time or a desired degrees, the ignition timing retarded by the desired period of time or desired degrees.

1 Claim, 10 Drawing Figures

IGNITION SYSTEM WITH IGNITION TIMING RETARDING CIRCUIT FOR INTERNAL COMBUSTION ENGINE

BACKGROUND OF THE INVENTION

This invention relates to a capacitor discharge type ignition system for an internal combustion engine, and more particularly to an ignition system for an internal combustion engine with an overrunning prevention circuit.

Conventionally, there has been available an ignition system for an internal combustion engine adapted to electrically prevent an overrunning of the engine, in which the generation of an ignition spark at an ignition plug is stopped or suppressed when the rotational speed of the engine exceeds a preset rotation. With this conventional method, however, intermittent occurrence of ignitions is repeated and hence the rotation of the engine repeats periodic increase and decrease. Also, an air-fuel mixture drawn into a combustion chamber enters directly an exhaust system when the ignition discharge is in ceasing and it is ignited by heat generated from a muffler at high temperatures, giving rise to an adverse burst of flame from the muffler exit.

Another conventional method which electrically retards the ignition timing in an ignition circuit to prevent an overrunning is disclosed in U.S. Pat. No. 4,144,859. In such a method, however, the value of retarded angle is limited to a fixed value and when an engine rotation exceeds the fixed value, insufficient protection against the overrunning results.

SUMMARY OF THE INVENTION

It is an object of this invention to provide an ignition system for an internal combustion engine with an overrunning prevention circuit which establishes a normal ignition timing within a rotation range normally used and which establishes a sharply retarded ignition timing at a rotational speed which slightly exceeds the normally used rotation range and thereafter the ignition timing is retarded continuously and in proportion to the rotational speed of the engine.

According to this invention, an ignition control thyristor, which is triggered by an ignition signal generated in synchronism with the engine rotation to discharge, through a primary winding of an ignition coil, electric charge stored in a capacitor at an ignition timing of the engine, has its gate connected with an overrunning prevention circuit which bypasses the ignition signal applied to the thyristor during a predetermined period. The overrunning prevention circuit comprises a switching circuit connected to the gate of the ignition control thyristor, and a predetermined duration signal generator circuit adapted to keep the switching circuit turning on during the predetermined period.

Accordingly, a signal of a predetermined duration extending from a reference rotational position of the crank shaft and independent of the engine rotational speed causes the switching circuit to bypass the ignition signal applied to the gate of the thyristor during the duration width. On the other hand, when the period at which ignition signals are generated in synchronism with the crank shaft rotation is shortened with an increased rotational speed of the engine, the occurrence of the ignition signal approaches to the reference crank shaft rotational position and in extremity enters an overrunning region which overlaps the bypass duration of the ignition signal at which the thyristor is turned off, so that the ignition can be retarded until the predetermined duration signal disappears. Thus, by determining a duration of the predetermined duration signal with respect to a normal rotation region of the engine, it is possible to automatically and steadily retard the ignition timing when an overrunning exceeds the normal rotation region. The retarded ignition timing can reduce the output of the engine and hence the rotational speed of the engine is prevented from being increased. It is also possible to readily set a maximum retard angle range which is adaptive to engine performance by selecting the effective width for the ignition signal in respect of the output and rotational speed range of the engine.

Since the ignition timing is retarded sharply when the engine exceeds the normal rotational speed range and the retard angle is continuously varied with an increase in the engine rotation, stable engine operation can be ensured which is free from troublesome explosive combustion inside the engine muffler and hunting in contrast to the conventional method which requires temporary stoppage of the ignition.

With an increased engine rotation, according to this invention, the ignition timing is advantageously retarded dependent on a variation in the period of occurence of the ignition signal voltage due to a variation in the rotational speed, thereby eliminating necessity of providing a unit which is exclusively used for setting and adjusting the retard angle in correspondence to the rotation speed.

DESCRIPTION OF THE PREFERRED EMBODIMENTS

Figure 1:
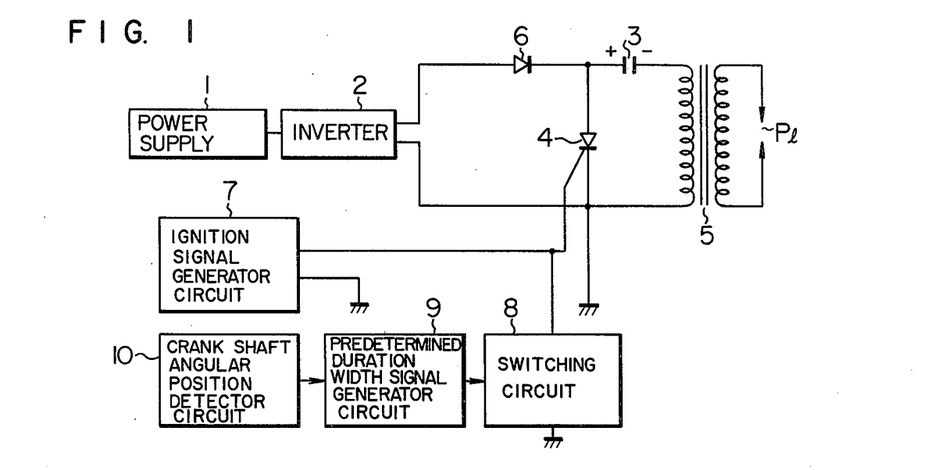
FIG. 1 is a block diagram of an ignition system embodying the present invention.

As diagrammatically shown in FIG. 1, an ignition system embodying the present invention comprises a capacitor charging power supply 1 such as for example a battery for supplying electric energy for ignition to a charging capacitor 3, and an inverter 2 in which a voltage of the battery is converted into a boosted a.c. voltage for periodic supply of charge current to the charging capacitor 3. An ignition signal generator circuit 7 produces an ignition signal in synchronism with rotation of an engine and supplies the ignition signal to an ignition control thyristor 4. To constitute an overrunning protection circuit, there are provided three circuits including a switching circuit 8 connected to the gate of the ignition control thyristor 4, a predetermined duration signal generator circuit 9 for keeping the switching circuit turning on during a predetermined duration, and a crank shaft rotational position detector circuit 10 for detecting a crank shaft rotational position which corresponds to a reference timing from which the predetermined duration signal starts.

Figure 2:
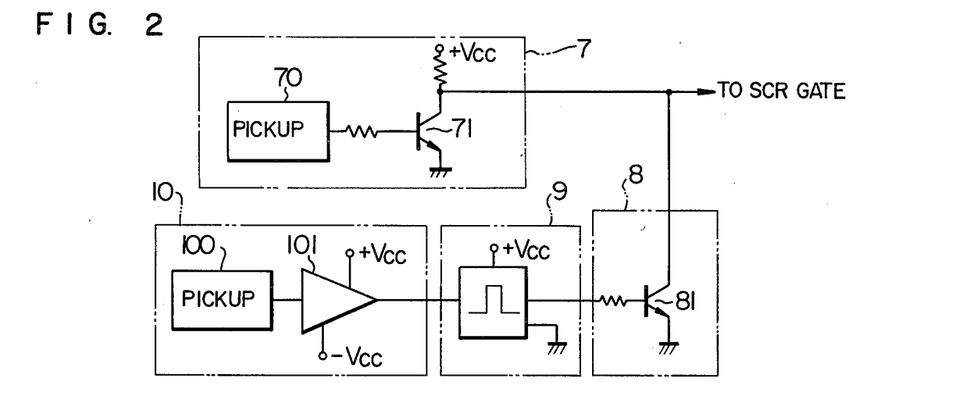
FIG. 2 is a circuit diagram to show details of some blocks in FIG. 1.
Figure 3:
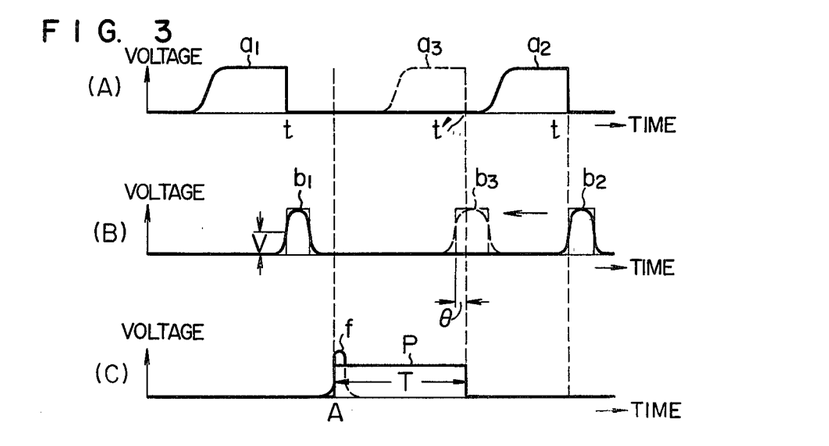
FIG. 3 is a time chart to show wave forms of capacitor charge voltage, ignition signal and predetermined duration signal appearing in the electric circuit shown in FIGS. 1 and 2.

With reference to FIGS. 1, 2 and 3, within a normal rotational speed range, the thyristor 4 is turned on by an ignition signal from the ignition signal generator circuit 7 to cause electric charge of the capacitor 3 to rapidly discharge through the thyristor 4 and a primary winding of an ignition coil 5 so that a high voltage is induced across a secondary winding of the ignition coil 5, spark is generated at an ignition plug Pl and the internal combustion engine is ignited. In this case, the capacitor 3 charged to a voltage $a_1$ as shown at (A) in FIG. 3 is discharged and the engine is ignited at a time t by an ignition signal $b_1$ shown at (B) in FIG. 3. Waveforms $a_2$ and $b_2$ correspond to a capacitor voltage and an ignition signal at the next cycle, respectively.

The crank shaft rotational position detector circuit 10 detects a crank shaft angular position serving as a reference to produce a detection signal and it comprises a pickup 100, for example, of an electromagnetic type having a magnet piece rotatable along with the engine crank shaft and a generator coil or of a photosensitive type having a rotary plate with light transmissive apertures rotatable along with the engine crank shaft and a light receiving element, and an amplifier 101 which amplifies an electric signal from the pickup 100 and produces a signal f as shown at (C) in FIG. 3. The timing for the signal f to develop, that is, the reference crank shaft angular position serves as an origin from which the predetermined duration signal to be described below starts and preferably, this reference angular position is so determined as to slightly retarded with respect to termination of the ignition signal duration.

The ignition signal generator circuit 7 comprises a pickup 70 of such an electromagnetic or photosensitive type as mentioned above and a signal produced from the pickup 70 in synchronism with the crank shaft rotation is amplified at a transistor 71 which produces an output signal as shown at (B) in FIG. 3, that is, the ignition signal $b_1$ to be supplied to the gate of the thyristor 4.

The predetermined duration signal generator circuit 9 comprises, for example, a monostable multivibrator which produces a signal p as shown at (C) in FIG. 3 having a predetermined duration T extending from the occurrence of the signal f of the crank shaft angular position detector circuit 10 and supplies the signal P to a control terminal of the switching circuit 8. This switching circuit 8 comprises, for example, a switching transistor 81 having a collector-emitter circuit connected to the gate of the thyristor 4 and which is kept turned on by the predetermined duration signal P during the duration of this signal width.

This embodiment operates to prevent an overrunning of the engine as will be described below. As the engine speed increases, the period of occurrence of ignition signals generated in synchronism with the crank shaft rotation is shortened in proportion to an increased engine rotational speed and as shown at (B) in FIG. 3, ignition signal $b_2$ within the normal rotational speed region, for example, approaches to ignition signal $b_1$ of the preceding cycle. At an overrunning, the ignition signal period is further shortened and ignition signal $b_3$ takes place. The predetermined duration signal P, on the other hand, has the predetermined duration T which starts from the reference angular position of the crank shaft or the origin related in the predetermined positional relationship with ignition signal $b_1$ at the preceding cycle. As a result, by determining the duration T in correspondence to the normal rotation region of the engine, the leading end of the ignition signal $b_3$ entering the overrunning region overlaps a trailing end portion of the predetermined duration signal P. In particular, the ignition signal $b_3$ as shown at (B) in FIG. 3 overlaps the predetermined duration signal P as shown at (C) in FIG. 3 at the trailing end portion thereof by an angle of $\theta$. The spark discharge takes place at the rise of the ignition signal (strictly speaking, when the rising voltage reaches the trigger voltage V of the thyristor 4). During the presence of the predetermined duration signal P, however, the switching circuit 8 connected to the gate of the thyristor 4 is turned on so that the ignition signal is bypassed to ground through the switching circuit 8 without triggering the gate of the thyristor 4. Consequently, the ignition timing is retarded by $\theta$ as shown in the FIG. 3 resulting in a decrease of the output of the engine with the rotation thereof inhibited from increasing. In this manner, as the degree of the overrunning increases, the retard angle $\theta$ increases and when the width of the retard angle $\theta$ exceeds an effective width (a width above the trigger level V as shown by a dotted square) of the ignition signal, the ignition discharge cannot take place any more. In effect, an allowable width of the retard angle for eliminating adverse effect of the ignition stoppage upon the engine and for effectively preventing the overrunning, namely, an effective width of the ignition signal is determined dependent on the output and rotation speed range of the engine and then such factors as configuration and size of a core of a magneto in the electromagnetic or photosensitive type pickup of the ignition signal generator circuit 7, turns of windings of a generator coil and photosensing response time are selected to obtain an ignition signal waveform having the desired effective width.

Figure 4:
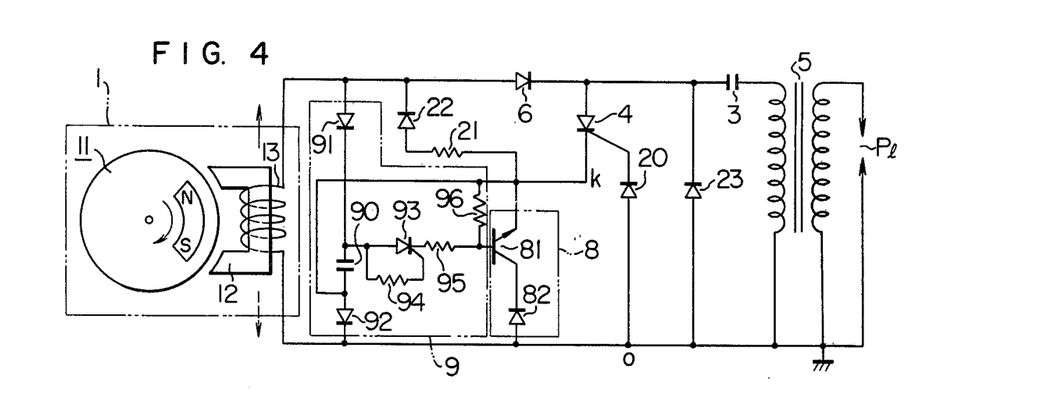
FIG. 4 is a circuit diagram of another embodiment of ignition system according to the invention.

In another embodiment of the present invention as shown in FIG. 4, a magneto substituted for the battery in the foregoing embodiment serves as a capacitor charging power supply and a half wave, for example, a positive half-cycle (or forward) voltage of an a.c. voltage generated from a generator coil of the magneto is used for charging the capacitor. This embodiment dispenses with an independent ignition signal generator circuit for supplying an ignition signal to an ignition control thyristor by using an ignition signal in the form of a negative half-cycle of the a.c. voltage generated from the generator coil of the magneto. In addition, a predetermined duration signal generator circuit as a principal part of an overrunning prevention circuit is constituted by a circuit to be detailed later wherein electric charge stored in an additional capacitor is discharged over a predetermined duration.

Figure 5:
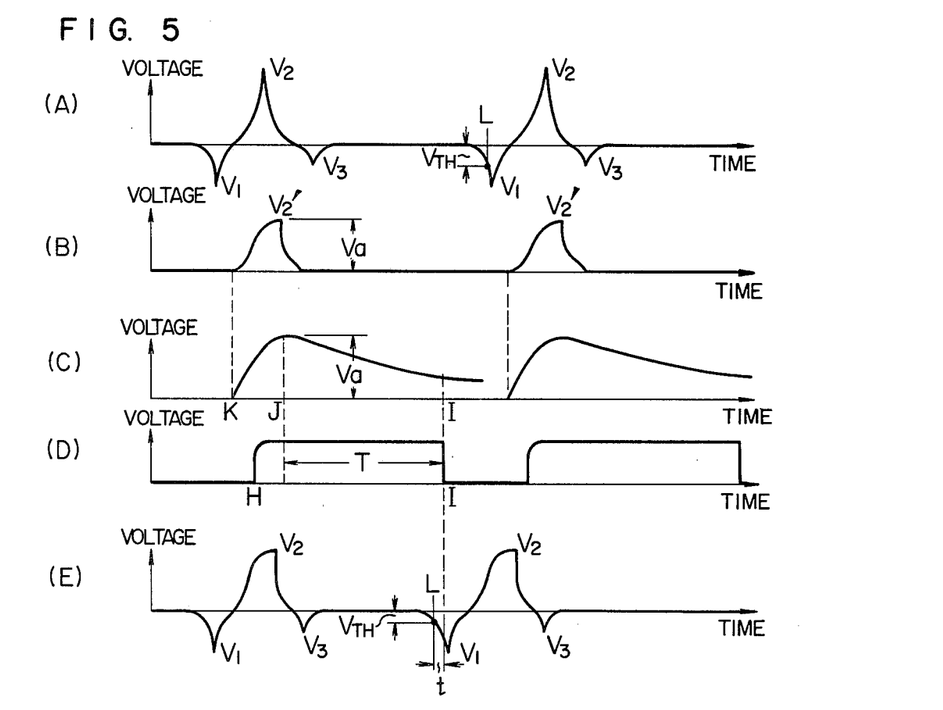
FIG. 5 is a time chart to show wave forms useful to explain operation of the circuit shown in FIG. 4.

With reference to FIG. 4, when a magnet integral with a magnetic rotor 11 rotates in synchronism with the rotation of an engine, magnetic flux in a generator coil core 12 changes to generate a voltage as shown at (A) in FIG. 5 across a generator coil 13. Current due to a positive half-cycle of a voltage $V_2$ charges a capacitor 3 through a diode 6 and returns to the generator coil 13 through a primary winding of an ignition coil 5. Actually, the positive half-cycle voltage developing across the generator coil 13 takes a distorted waveform $V_2'$ as shown at (B) in FIG. 5 because it is loaded with the charging capacitor 3 to feed thereto a charging current. The capacitor 3 charged by the charging current due to the positive half-cycle voltage has a peak charging voltage which approximates to $V_a$ shown at (B) in FIG. 3. Like the conventional design, the peak voltage $V_a$ is designed to be kept substantially constant irrespective of a change in the rotational speed of the engine by taking into consideration turns of windings of the generator coil 13 and size of the magnet.

In this embodiment, a predetermined duration signal generator circuit 9 operates as follows. Concurrently with charging of the capacitor 3 by the positive half-cycle voltage $V_2$, a capacitor 90 of a sufficiently smaller capacitance than that of the capacitor 3 is also charged by the voltage $V_2$ through a closed circuit of diode 91, capacitor 90, diode 92 and generator coil 13. The capacitors 3 and 90 are charged up to substantially the same voltage level when compared immediately after completion of charging. While the charging voltage on the capacitor 3 is approximately held at $V_a$ until the thyristor 4 is turned on, electric charge on the capacitor 90 is discharged in the course of its charging, when a current flowing through a resistor 94 connected to the gate of a thyristor 93 comprised of a discharging circuit for the capacitor 90 reaches a gate triggering level of the thyristor 93 to turn on the same, through a closed circuit of thyristor 93, and resistors 95 and 96. Even when the capacitor 90 is discharging, the peak voltage of the capacitors 3 and 90 are maintained at substantially the same level since these capacitors 3 and 90 continue to be charged in parallel.

Connected in parallel with the gate-cathode circuit of the ignition discharge control thyristor 4 is a switching transistor 81 which constitutes a switching circuit 8 adapted to control the short-circuit timing of the gate-cathode circuit of the thyristor 4 and to bypass the ignition signal. The base-emitter circuit of the transistor 81 is connected in parallel with the resistor 96 so that the discharging current of the capacitor 90 is passed not only through the resistor 96 but also through the base-emitter circuit of the transistor 81.

Because of such a discharging, the charging voltage on the capacitor 90 decreases as shown at (C) in FIG. 5 and at the same time current flowing through the anode-cathode circuit of the thyristor 93 decreases. When this current falls below a holding current of the thyristor 93, the thyristor 93 is rendered cut off.

Through a duration J-I of conduction of the thyristor 93 as shown at (C) in FIG. 5, electric charge on the capacitor 90 is only discharged. However, due to the fact that in the capacitor discharge type ignition apparatus as discussed herein, the charging voltage on the capacitor 3 is designed to be kept substantially constant irrespective of the rotational speed within the rotation range normally used, the peak value $V_a$ as shown at (C) in FIG. 5 of the charging voltage on the capacitor 90 is equal to the charging voltage on the capacitor 3 and kept constant irrespective of the rotational speed of the engine. Accordingly, under the condition that all of the peak value $V_a$, capacitance of the capacitor 90 and resistances of the resistors 95 and 96 are constant, the duration J-I of conduction of the thyristor 93 as shown at (C) in FIG. 5 is kept constant irrespective of variation in the rotational speed of the engine.

During the duration J-I, the discharging current of the capacitor 90 flows through the base-emitter circuit of the transistor 81 as described above to increase the base-emitter voltage, thereby making the collector-emitter circuit conductive. It is now assumed that within duration J-I, a negative half-cycle voltage $V_3$ develops across the generator coil 13 immediately after the positive half-cycle voltage $V_2$. Then, the negative half-cycle voltage $V_3$ would make higher the potentials at the gate of the thyristor 4 connected through a diode 20 to earth point 0 and at the collector of the transistor 81 connected through a diode 82 to the point 0 than the potentials at cathode K of the ignition control thyristor 4 and at the emitter of transistor 81 connected to the cathode K, and the thyristor 4 would be turned on. However, since the transistor 81 is in conduction because of the discharging of the capacitor 90, current due to the negative half-cycle voltage $V_3$ will flow through diode 82, transistor 81, resistor 21 and diode 22 and the thyristor 4 will not be turned on. Accordingly, it is possible to use a negative half-cycle voltage $V_1$ (just preceding the $V_2$) as an ignition signal while eliminating erroneous operations which would be caused by the voltage $V_3$.

When the engine rotates at low speeds, successive electromotive forces are generated in the generator coil 13 at a long period and a negative half-cycle voltage $V_1$ at the subsequent cycle develops after the termination of the duration J-I shown at (C) and (D) in FIG. 5. As a result, the ignition discharge is carried out at normal ignition timing L of the engine as shown at (A) in FIG. 5. However, as the engine speed increases, electromotive forces in the generator coil 13 or voltages thereacross are generated at a short period. At an increased rotational speed, a point (timing) L at which the negative half-cycle voltage $V_1$ representative of the ignition signal reaches a triggering voltage $V_{TH}$ for the thyristor 4 will coincides with a point I shown at (D) in FIG. 5. This rotational speed is herein termed as a preset rotational speed $N_S$ and establishes an upper limit below which the ignition discharge is carried out at the normal ignition timing.

When the engine rotational speed exceeds the preset rotational speed $N_S$, the period of occurrence of ignition signals $V_1$ is further shortened and as shown at (E) in FIG. 5, the normal ignition timing L (at which the ignition signal voltage reaches $V_{TH}$) enters the duration J-I. Within the duration J-I, the ignition signal to be supplied to the thyristor 4 is bypassed by the transistor 81, rendering the thyristor 4 non-conductive, and the ignition timing is retarded by a time t with respect to the normal ignition timing L to coincide with the termination of the duration J-I.

Figure 6:
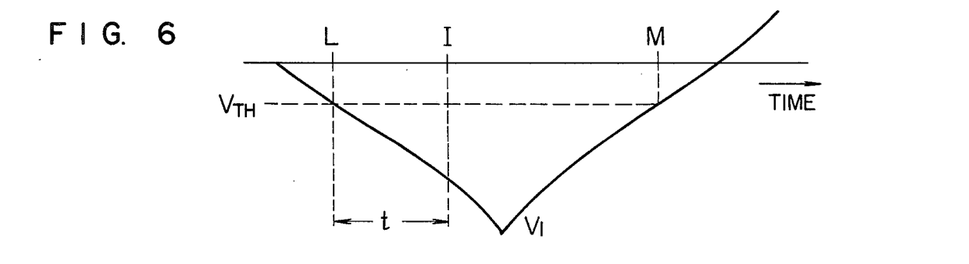
FIG. 6 is a diagrammatic representation to show, in enlarged form, of the ignition signal in FIG. 5.

The operation for retarding the ignition timing will be described in more detail with reference to FIG. 6 which illustrate, in enlarged scale, the negative half-cycle voltage $V_1$ shown at (E) in FIG. 5. Even when the ignition signal voltage $V_1$ increases and reaches $V_{TH}$ at the normal ignition timing L, the thyristor 4 is kept turned off since the transistor 81 is conducting. As the voltage $V_1$ proceeds, the transistor 81 is rendered cut off at point I at which the thyristor 4 is turned on since the ignition signal voltage is exceeding $V_{TH}$. In this manner, the ignition angle is retarded with respect to the normal ignition timing by a crank angle corresponding to time t. This retard angle is increased with increase in the engine rotational speed. The valied retard angle is continuous and ranges to point M at maximum. This range is sufficient to prevent the overrunning of the engine.

A resistor 21 in FIG. 4 restricts current flow in the generator coil 13 when the reverse electromotive force develops so as to reduce distortions in the ignition signal waveform and at the same time it reduces current flow in the transistor 81. Also, a voltage drop across the resistor 21 reduces the collector-emitter voltage of the transistor 81 and the gate-cathode voltage of the thyristor 4. The diode 82 protects the transistor 81. The diode 20 is effective to adjust impedances of the emitter-collector circuit of the transistor 81 and of the gate-cathode circuit of the thyristor 4. The diode 20 may be replaced with an element which can balance the impedances of the two circuits. A plurality of diodes may be substituted for the diode 20 for the temperature compensation purpose. The diode 82 also serves to lower the cathode potential below the gate potential when the negative half-cycle voltage develops. A diode 23 in FIG. 4 constitutes a resonance circuit along with the capacitor 3 and the primary winding of the ignition coil 5 after the capacitor 3 is discharged.

In this embodiment, in order to prevent the overrunning, the gate-cathode circuit of the ignition control thyristor 4 is kept short-circuited by the switching transistor 81 through the predetermined duration beginning at the reference crank shaft angular position, for example, the peak time J of the charging voltage on the charging capacitor 3 (corresponding to the termination of charging of the capacitor 90) irrespective of variations in the engine rotational speed. The period of occurrence of ignition signal voltages $V_1$ generated by the generator coil 13 approaches to the reference crank shaft angular position in response to an increased rotational speed of the engine, and when it exceeds the normal rotation range of the engine and enters the predetermined duration within which the ignition control thyristor is kept short-circuited, the ignition timing is delayed.

Figure 7:
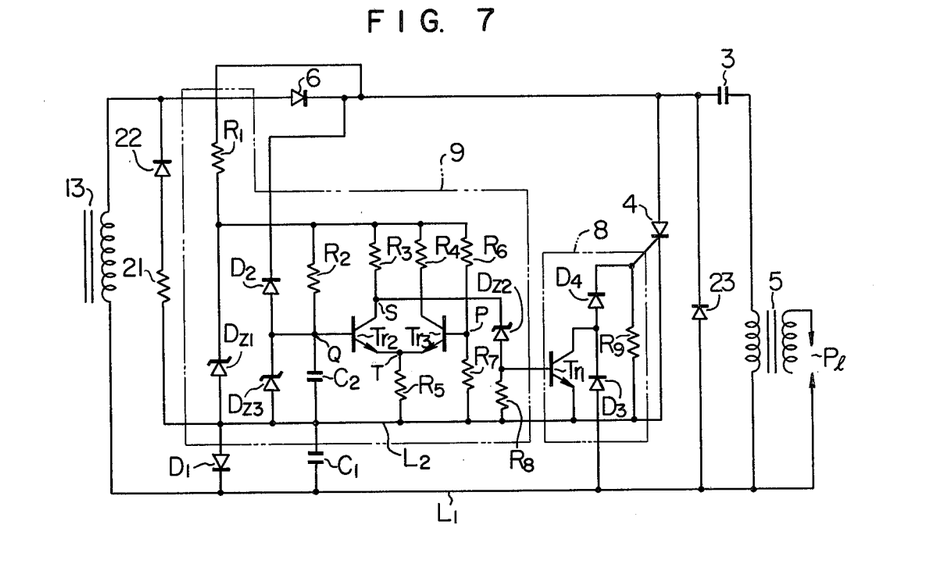
FIG. 7 is a circuit diagram of still another embodiment of ignition apparatus according to the invention.

FIG. 7 shows a circuit diagram of another embodiment in which as is the case in FIG. 4, a magneto is provided to charge a capacitor from a positive half-cycle voltage generated thereby, and a negative half-cycle voltage is used as an ignition signal for an ignition control thyristor. However, in the embodiment in FIG. 7, differing from the case shown in FIG. 4, a part of electric charge from a charging capacitor is used as a source of a predetermined duration signal which functions to maintain a switching circuit connected to the gate of the ignition control thyristor to be conductive for a predetermined time period starting from the completion of the charging capacitor. Furthermore, the control of the time period of the predetermined duration signal is carried out by comparing a voltage developed across a capacitor charged from a part of electric charge on the charging capacitor and increasing according to a predetermined time-constant with a predetermined reference voltage.

Figure 8:
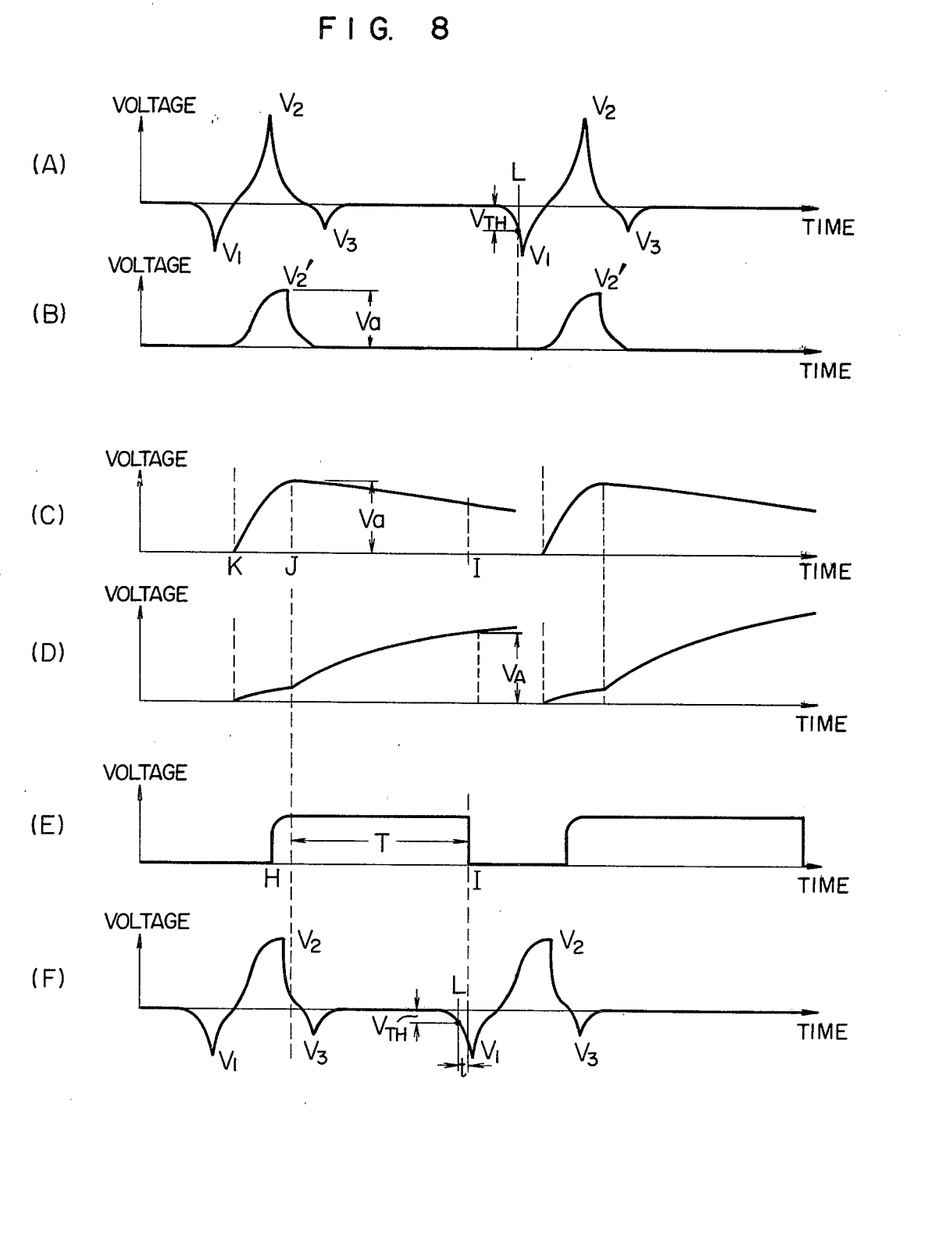
FIG. 8 shows waveforms useful to explain operation of the circuit of FIG. 7.

Referring to FIG. 7 and FIG. 8 showing waveforms, a charging capacitor 3 is charged from, for example, a positive half-cycle voltage $V_2$ as shown at (A) in FIG. 8 ((A) and (B) in FIG. 8 are similar to (A) and (B) in FIG. 4) through a diode 6, and a resultant charged voltage on the capacitor 3 is shown at (C) in FIG. 8. A series circuit of a resistor $R_1$, Zener diode $D_{Z1}$ and diode $D_1$ is connected in parallel with a series circuit of the capacitor 3 and a primary winding of ignition coil 5, and a part of electric charge charged on the capacitor 3 flows through the first mentioned series circuit with the result that a predetermined constant voltage is developed and maintained across the Zener diode $D_{Z1}$. Furthermore, since a series circuit of a resistor $R_2$ and a capacitor $C_2$ is connected in parallel with the Zener diode $D_{Z1}$, the capacitor $C_2$ is also charged from a part of electric charge on the charging capacitor 3 simultaneously. Specifically, as shown at (D) in FIG. 8, the capacitor $C_2$ is initially charged very slowly from the positive half-cycle voltage from the generator coil 13 concurrently with the charging capacitor 3, and after completion of charging of the charging capacitor 3, a part of electric charge on the capacitor 3 flows through a resistor $R_1$ and resistor $R_2$ into the capacitor $C_2$ thereby to charge the capacitor $C_2$ in accordance with a time-constant $R_2 \times C_2$. As a result, a voltage which increases according to the time constant $R_2 \times C_2$ is developed at the junction between the resistor $R_2$ and capacitor $C_2$. Although the charge voltage on the charging capacitor 3 tends to decrease very slowly with time due to the charging of the capacitor $C_2$, the charge voltage (FIG. 8 (C)) is maintained substantially at the same level, and thus the predetermined constant voltage is maintained across the Zener diode $D_{Z1}$.

In parallel with the Zener diode $D_{Z1}$, in addition to the series circuit of resistor $R_2$ and capacitor $C_2$ (or a time constant circuit), there are connected a further series circuit of resistors $R_6$ and $R_7$ for establishing a reference voltage at the junction thereof and a parallel circuit of two transistors $T_{r2}$ and $T_{r3}$. The parallel circuit of transistors $T_{r2}$ and $T_{r3}$ has emitters connected at a junction point T to a common resistor $R_5$ which in turn connected to the anode of the Zener diode $D_{Z1}$, and bases of the transistors $T_{r2}$ and $T_{r3}$ are respectively connected to the junction Q between the resistor $R_2$ and the capacitor $C_2$ of the time constant circuit and the junction P of the resistors $R_6$ and $R_7$ of the reference voltage establishing circuit. Collectors of the transistors $T_{r2}$ and $T_{r3}$ are respectively connected via resistors $R_3$ and $R_4$ to the cathode of the Zener diode $D_{Z1}$. In such a circuit arrangement, the parallel transistor circuit compares with each other the voltages developed at points P and Q which are connected respectively to the bases of the parallel transistors $T_{r2}$ and $T_{r3}$, and the transistor $T_{r3}$ becomes conductive when the voltage $V_P$ at the point P is larger than the voltage $V_Q$ at the point Q whereas the transistor $T_{r2}$ becomes conductive when the voltage $V_Q$ is larger than the voltage $V_P$. In this case, the voltage $V_P$ at point P is a divided voltage of the constant voltage across the Zener diode $D_{Z1}$ by the resistors $R_6$ and $R_7$ and hence the voltage $V_P$ is substantially constant and serves as the reference voltage. Further, as described previously, the voltage $V_Q$ at point Q is a voltage which increases in accordance with the time constant $R_2 \times C_2$ following the completion of charging of the capacitor 3. For this reason, the parallel transistor circuit constitutes a circuit for detecting which of the voltages $V_P$ and $V_Q$ is larger.

The junction point S of the collector of the transistor $T_{r2}$ and the resistor $R_3$ is connected to a series circuit of a Zener diode $D_{Z2}$ and a resistor $R_8$, and the junction between the Zener diode $D_{Z2}$ and resistor $R_8$ is connected to base of a switching transistor $T_{r1}$. Consequently, a series circuit of the resistor $R_3$, Zener diode $D_{Z2}$ and resistor $R_8$ is connected in parallel with the Zener diode $D_{Z1}$, and the constant voltage across the Zener diode $D_{Z1}$ is applied across this series circuit. Since, a breakdown voltage of the Zener diode $D_{Z2}$ is selected to be lower than the constant voltage across the Zener diode $D_{Z1}$, a current flows from the charging capacitor 3 through the resistors $R_1$ and $R_3$, Zener diode $D_{Z2}$ and resistor $R_8$. As a result, the base-emitter voltage of the switching transistor $T_{r1}$ rises at a time H as shown at (E) in FIG. 8, and this voltage is maintained at substantially the same level after completion (at a time J) of charging of the charging capacitor 3 so long as the voltage $V_P$ at point P is larger than the voltage $V_Q$ at point Q, and thus the switching transistor $T_{r1}$ is also conductive.

As described above, until the voltage $V_Q$ exceeds the reference voltage $V_P$, the transistor $T_{r3}$ is conductive, and further, since the Zener diode $D_{Z2}$ is applied with a voltage above the breakdown voltage thereof, a current flows to base of the switching transistor $T_{r1}$ and rendering conductive. During the conduction of the switching transistor $T_{r1}$, even when an ignition signal, that is, a negative half-cycle voltage occurs at a position of $V_1$ (second) shown at (F) of FIG. 8 due to high rotational speeds of the engine and due to shortening of the period of occurence of the ignition signals from the generator coil 13, the ignition signal $V_1$ will be bypassed by the switching transistor $T_{r1}$ after passing through a diode $D_3$ and returns to the generator coil 13 through a resistor 21 and diode 22. No ignition signal flows into the gate of the ignition control thyristor 4.

When the voltage $V_Q$ increases and exceeds the reference voltage $V_P$ as shown at (D) in FIG. 8, the transistor $T_{r3}$ turns off and the transistor $T_{r2}$ turns on, and thus, a part of electric charge flows from the charging capacitor 3 through the resistors $R_1$ and $R_3$, transistor $T_{r2}$, resistor $R_5$ and diode $D_1$. As a result, a voltage at a junction point S of the resistor $R_3$, Zener diode $D_{Z2}$ and collector of transistor $T_{r2}$ drops below the breakdown voltage of the Zener diode $D_{Z2}$, and no current flows through the junction point S and further through the Zener diode $D_{Z2}$ and resistor 8. The switching transistor $T_{r1}$ is thus turned off. This occurs at a time I shown at (E) in FIG. 8. At high engine speeds as shown at (F) in FIG. 8, the ignition signal $V_1$ (second) is permitted to flow the gate of the thyristor 4 delayed by a time period t from a normal ignition timing L, and the capacitor 3 discharges through the thyristor 4, diode $D_1$ and the primary winding of the ignition coil 5 to generate spark at a plug $P_l$. Upon discharging of the capacitor 3, since the charged voltage of the capacitor 3 is not applied to the Zener diode $D_{Z1}$ of the constant voltage circuit and to the capacitor $C_2$ of the time constant circuit any more, electric charge of the capacitor $C_2$ is also discharged through the diode $D_2$ and thyristor 4.

In the arrangement described above, when the voltage $V_Q$ exceeds the reference voltage $V_P$ and the transistor $T_{r2}$ becomes conductive, the voltage $V_S$ at point S is made substantially equal to the voltage $V_Q$ at point Q and to the voltage at point T, and furthermore, the Zener diode $D_{Z2}$ is so selected that the voltage $V_S$ at point S, etc., is not lower than the breakdown voltage of the Zener diode $D_{Z2}$. Furthermore, at normal and low engine speeds, the capacitor $C_2$ is continuously charged even after the voltage $V_Q$ at point Q exceeds the reference voltage $V_P$ and the voltage across the capacitor $C_2$ is further increased. For this reason, a Zener diode $D_{Z3}$ is connected across the capacitor $C_2$ to limit the voltage developed across the capacitor $C_2$ to a predetermined level and to protect it. Even in such a situation, in order to limit the voltage a point S to a lower level not exceeding the breakdown voltage of the Zener diode $D_{Z2}$ connected to the switching transistor $T_{r1}$, suitable properties and values are selected for the Zener diode $D_{Z3}$ and resistors $R_4$ and $R_6$. A capacitor $C_1$ is connected between common lines $L_1$ and $L_2$ respectively connected to the negative side of the generator coil 13 and the anode of the Zener diode $D_{Z1}$ of the constant voltage establishing circuit for the purpose of preventing noise from being introduced to the thyristor 4, switching circuit 8 and predetermined duration signal generating circuit 9.

Furthermore, the circuit arrangement of FIG. 7 is so designed that the predetermined duration T, which starts from the completion of charging of the capacitor 3 and during which time period the switching transistor $T_{r1}$ is maintained in a conductive condition, can be set as accurate as possible irrespective of the non-uniform properties caused in manufacturing various circuit elements constituting the predetermined duration signal generating circuit. In other words, the termination time of the predetermined duration T is determined by comparing the voltage $V_Q$ increasing in accordance with the time constant $R_2 \times C_2$ with the reference voltage $V_P$, and the reference voltage $V_P$ is not so affected by the non-uniform properties of the circuit elements due to the fact that the reference voltage $V_P$ is a factor of the ratio of two resistors $R_6$ and $R_7$ and that resistors are usually manufactured with a high precision. Hence, even though the Zener diode $D_{Z1}$ is manufactured more or less with non-uniform precision, the adverse effect of the Zener diode $D_{Z1}$ will not be significant, and the reference voltage $V_P$ will be affected primarily by non-uniform properties of the capacitor $C_2$ in the time constant circuit. The other circuit elements will not affect the precision of the predetermined duration T so much as far as the non-uniformity in properties are within a certain limit.

Figure 9:
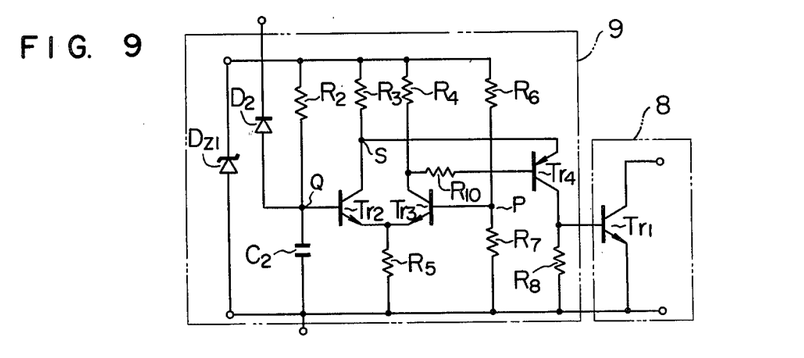
FIGS. 9 and 10 are, respectively, partial circuit diagrams showing modifications of a predetermined duration signal generating circuit in FIG. 7.
Figure 10:
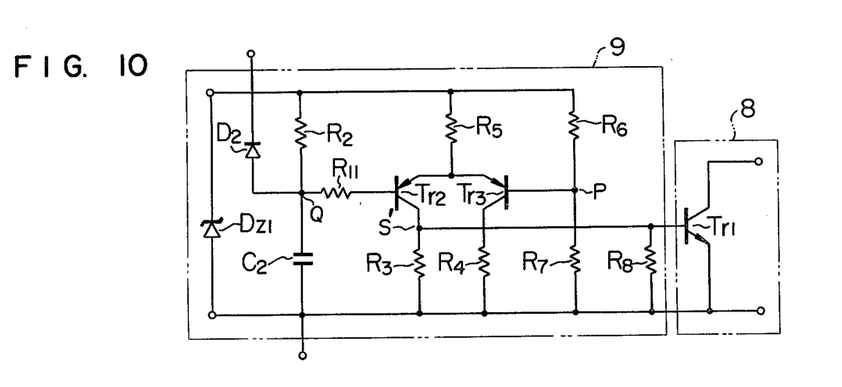

FIGS. 9 and 10 show respectively partial modifications of the circuit of FIG. 7 in which a decrease in base current of the switching transistor $T_{r1}$ due to the voltage drop caused by the Zener diode $D_{Z2}$ is to be avoided. In FIG. 9, a switching transistor $T_{r4}$ substitutes for the Zener diode $D_{Z2}$ in FIG. 7 and the base of the switching transistor $T_{r4}$ is connected to the collector of the transistor $T_{r3}$ via a resistor 10. The operation in FIG. 9 is similar to that in FIG. 7.

In FIG. 10, the base of the switching transistor $T_{r1}$ is directly connected to a junction point S' which corresponds to the point S in FIG. 7. A current flows into the base of the switching transistor $T_{r1}$ through a resistors $R_2$ and 11 and a transistor $T_{r2}$.

What is claimed is:

1. An ignition system with an ignition retard circuit for an internal combustion engine comprising:
   a magneto coupled to a crank shaft of said engine;
   an ignition coil having primary and secondary windings;
   a charging capacitor charged from one half-cycle of a.c. voltage generated by said magneto;
   an ignition control thyristor connected in parallel with a series circuit of said charging capacitor and the primary winding of said ignition coil, said ignition control thyrsitor being rendered conductive by receiving the opposite half-cycle of said a.c. voltage from said magneto as an ignition signal;
   a switching transistor connected in parallel to a gate-cathode circuit of said ignition control thyristor, said switching transistor being adapted to become conductive upon receiving a switching signal and to bypass said ignition signal without applying to the gate of said ignition control thyristor;

a series circuit of a first resistor and a first Zener diode connected in parallel to the series circuit of said charging capacitor and the primary winding of said ignition coil, said first Zener diode maintaining a predetermined constant voltage thereacross during said charging capacitor being held charged;

a voltage divider circuit including a series of two resistors connected in parallel to said first Zener diode for establishing a reference voltage at a junction point of said two resistors;

a time constant circuit including a series of a resistor and a capacitor connected in parallel with said first Zener diode for developing a voltage at a junction point of said resistor and said capacitor increasing in accordance with a time constant of said time constant circuit;

a parallel circuit of first and second transistors connected in parallel with said first Zener diode, said first and second transistors having bases respectively connected to the junction point of said time constant circuit and the junction point of said voltage divider circuit, said first and second transistors having collectors connected to the cathode of said first Zener diode respectively via second and third resistors and having emitters connected to the cathode of said first Zener diode via a common resistor a junction point between the collector of said first transistor and said first resistor being connected to the base of said switching transistor via a second Zener diode, said second transistor being conductive during a period in which said reference voltage established in said voltage divider circuit is higher than said voltage developed in said time constant circuit, and said switching signal being supplied to said switching transistor through said junction point between the collector of said first transistor and said first resistor and through said second Zener diode, whereas said first transistor being rendered conductive when the voltage at the junction point of said time constant circuit is higher than said reference voltage thereby to cut off the supply of said switching signal to said switching transistor.

* * * * *